United States Patent [19]
Basse

[11] Patent Number: 5,997,972
[45] Date of Patent: Dec. 7, 1999

[54] FILLING MATERIAL FOR PERCOLATING FILTERS FOR THE TREATMENT OF FLUIDS AND PROCESS FOR THE PRODUCTION OF SAME

[75] Inventor: Hartwig Basse, Nordenham, Germany

[73] Assignee: Norddeutsche Seekabelwerke Aktiengesellschart, Nordenham, Germany

[21] Appl. No.: 08/291,780

[22] Filed: Aug. 17, 1994

[30] Foreign Application Priority Data

Aug. 26, 1993 [DE] Germany ............................. 43 28 641

[51] Int. Cl.⁶ .............................. B01D 39/04; C02F 3/04
[52] U.S. Cl. ................... 428/53; 156/84; 156/85; 156/250; 156/265; 210/615; 210/483; 210/488; 210/500.1; 428/77; 428/190; 428/192
[58] Field of Search .................. 210/483, 500.1, 210/488; 428/294, 53, 77, 192, 190; 156/84, 85, 250, 265

[56] References Cited

U.S. PATENT DOCUMENTS

| | | |
|---|---|---|
| 4,219,420 | 8/1980 | Muller ................................ 210/483 |
| 4,929,484 | 5/1990 | Basse . |
| 5,104,716 | 4/1992 | Wittek . |
| 5,160,395 | 11/1992 | Basse . |

FOREIGN PATENT DOCUMENTS

| | | |
|---|---|---|
| 145853 | 6/1985 | European Pat. Off. . |
| 3047967 | 7/1982 | Germany . |
| 32 17 923 | 11/1983 | Germany . |
| 33 45 595 | 6/1985 | Germany . |
| 36 41 960 | 6/1988 | Germany . |
| 38 07 695 | 9/1989 | Germany . |
| 39 16 250 | 2/1990 | Germany . |
| 41 12 983 | 12/1991 | Germany . |
| 42 13 814 | 10/1993 | Germany . |
| 32915 | 2/1984 | Japan . |
| 2 017 075 | 3/1979 | United Kingdom . |

*Primary Examiner*—James C. Cannon
*Attorney, Agent, or Firm*—Deveau, Colton & Marquis

[57] ABSTRACT

Filling material for percolating filters used in the biological treatment of fluids are provided with strips which are made of plastic and are connected to one another via a transversely directed holding web. The strips are arranged one above the other in a plurality of layers in order to increase the strip density. In the filling material according to the invention, the strips are provided with different cross-sections over their length. For example, the strips may be reduced in width in regions adjacent to their connection to the holding web. As a result, the strips can be arranged in one layer with an increased strip density.

14 Claims, 5 Drawing Sheets

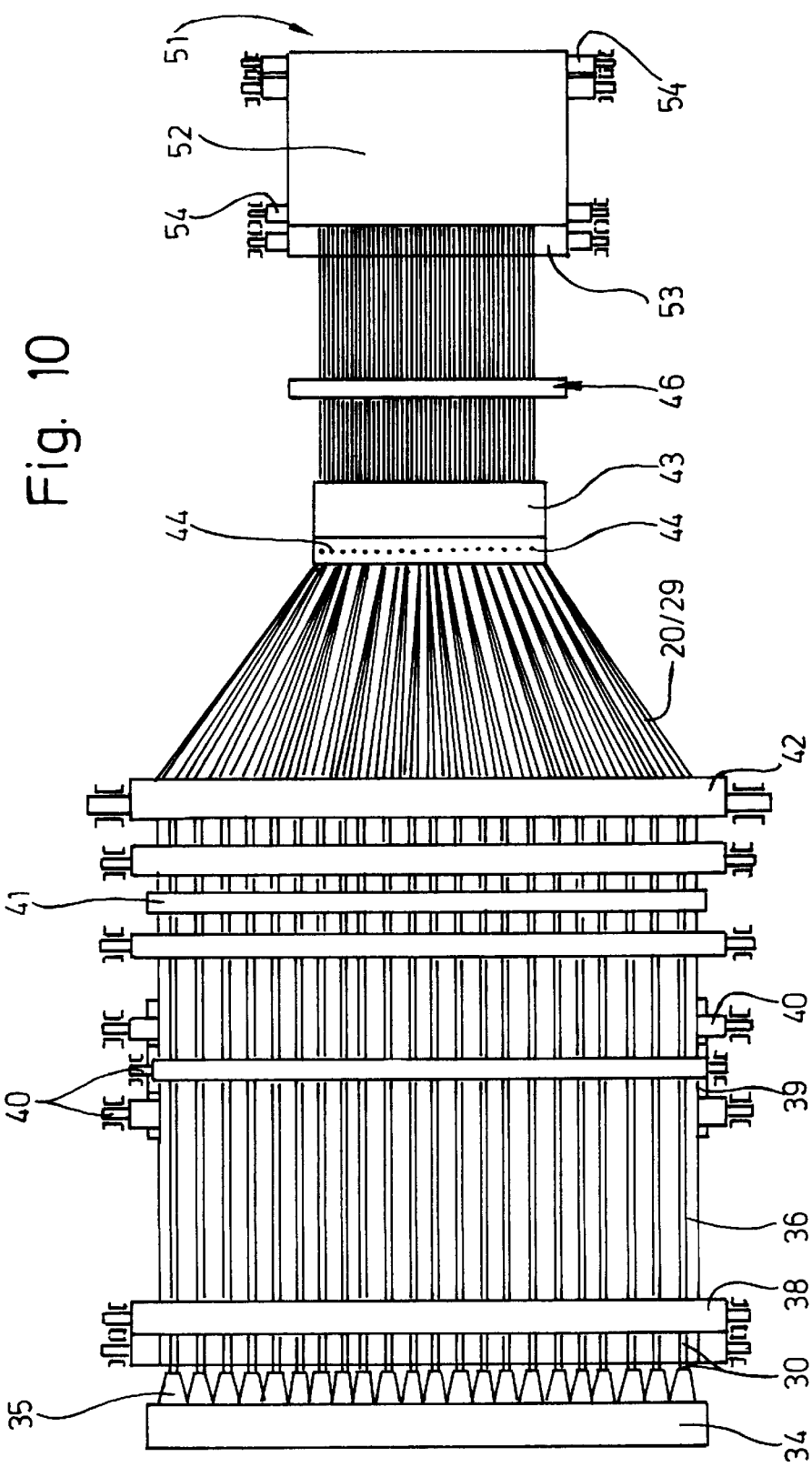

FILLING MATERIAL FOR PERCOLATING FILTERS FOR THE TREATMENT OF FLUIDS AND PROCESS FOR THE PRODUCTION OF SAME

BACKGROUND OF THE INVENTION

1. Field of the Invention

The invention relates to a filling material for percolating filters for the treatment of fluids, especially for biological sewage purification. The invention relates, furthermore, to a process for the production of filling material serving for the treatment of fluids.

2. Description of Related Art

The percolating filters under discussion here are used predominantly in sewage technology for biological sewage treatment. However, they can also be used for other treatment of liquids and gases, especially waste gases, such treatment also preferably taking place biologically. The percolating filters serve as carriers for the bacteria necessary for biological treatment, particularly of the so-called biological lawn. The efficiency of a sewage-purification plant equipped with filling material of this type is determined by a plurality of factors. On the one hand the filling material is to offer as large a specific growth surface as possible, and on the other hand as good a hold as possible of the bacteria on the filling material is to be guaranteed. Finally, the fluid to be treated, a liquid or a gas, is to be capable of flowing round or wetting the biological lawn on the filling material without any obstruction.

EP-B 0 274 633 discloses a filling material of the relevant generic type, strips of which are connected to one another by means of a holding web directed transversely relative to the longitudinal direction of these. The strips have identical cross-sections over their length. They are provided with curved-up portions on opposite edge regions. In the middle, the strips have a flat shape. It has proved to be disadvantageous that, as a result of the weight load of the biological lawn settling on the strips, in course of time the strips are pulled flat and consequently gradually stick together. The fluid therefore can no longer flow through between the biological lawn of adjacent strips. The effectiveness of a sewage-treatment plant provided with such filling material is thereby reduced.

To avoid the abovementioned disadvantage, a filling material; on the strips of which a single strand is arranged approximately centrally, is known from EP-B 0 332 907. The strips likewise have identical cross-sections over their length. To increase the strip density, the strips have to be arranged one above the other in a plurality of layers. It has been shown that the fluid to be treated is distributed only unevenly over the different layers of the strips. The effective strip density is consequently restricted essentially to the upper layer.

Furthermore, it has proved complicated to form filling material with a plurality of layers of strips arranged one above the other.

SUMMARY OF THE INVENTION

Proceeding from this, the object on which the invention is based is to provide a filling material for percolating filters which is effective and nevertheless can be produced in a simple way and which has a high effective strip density, and the process for the production of same.

To achieve this object, the filling material according to the invention has a multiplicity of plastic strips which are reduced in width in regions adjacent to their connection to a holding web. As a result of the narrowing in cross-section on the strips, considerably more strips can be arranged next to one another on one layer. The strip density is increased. There is therefore no need to arrange the strips in a plurality of layers arranged one above the other. The production outlay for the filling material is thus reduced.

In an advantageous embodiment of the filling material, the width of the strips decreases at least in the region of the holding web and preferably in a region immediately on the left and/or right next to the holding web, the region of reduced width of the strips being coordinated with the dimensions of the carrier device. This prevents the fluid to be treated from building up in the region of the carrier device.

According to an advantageous development of the invention, at least one strand, preferably one strand group consisting of two or three tension-absorbing individual strands, is arranged on the strips, the individual strands extending in the longitudinal direction of the strips. One advantage of this development is that the strips cannot stretch under the load of the biological lawn settled on them and therefore preserve their wavy shape. Arrangement of a strand group consisting of a plurality of individual strands guarantees a better load distribution. The narrowing of the strips can be determined by the number and spacing of the tension-absorbing individual strands on the strips. The individual strands can be arranged either on one side or on both sides of the strips.

A further filling material serving for achieving the object has a holding web which is formed from two parallel part webs, with the strips extending between the part webs of the holding web and being connected firmly to the part webs. The connection of the strips from both sides to the holding web guarantees the reliable and virtually unreleasable connection of the strips to the holding web.

The process according to the invention preferably includes a step wherein the strips are reduced in width in regions along their length where they will be connected before they are actually connected to the holding web or the holding webs. The strips processed in this way are subsequently connected to the transversely directed holding web or a plurality of holding webs.

In a further development of the process according to the invention provision is made for at least one, preferably two or three (extruded) individual strands, produced continuously under the effect of heat, to be applied in at least a warm state to the material web continuously. The strands are sealed or welded together with the material web, particularly under the effect of pressure.

Further preferred developments of the invention emerge from the subclaims and from the description.

Preferred exemplary embodiments of the invention are explained in more detail below by means of the drawings.

BRIEF DESCRIPTION OF THE DRAWINGS

FIG. 10 shows a diagrammatically represented top view of the apparatus according to FIG. 9.

DESCRIPTION OF THE PREFERRED EMBODIMENTS

The filling material shown in the exemplary embodiments serves as a percolating filter, for example for biological sewage treatment.

FIGS. 1 to 8 show embodiments of the filling material, in which a multiplicity of elongate stripe 20 lying next to one another are connected to one another by means of a central holding web 21 extending transversely. Here, the individual strips 20 of the filling material are arranged in one layer. It is also possible, however, to arrange the strips 20 in a plurality of layers lying one above the other.

Figure 3:
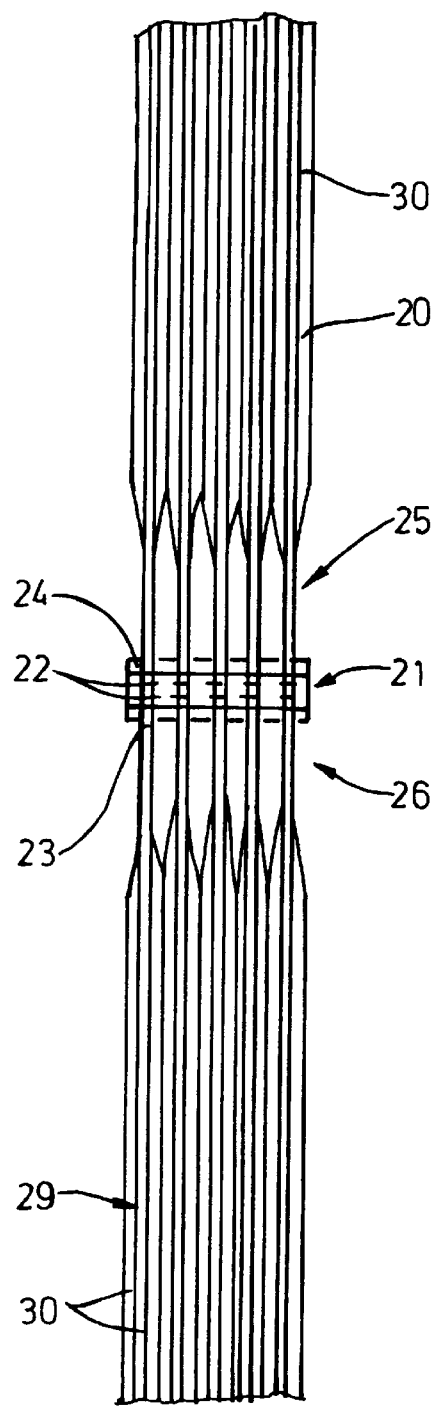
FIG. 3 shows a top view of the filling material according to FIG. 1 and FIG. 2.
Figure 4:
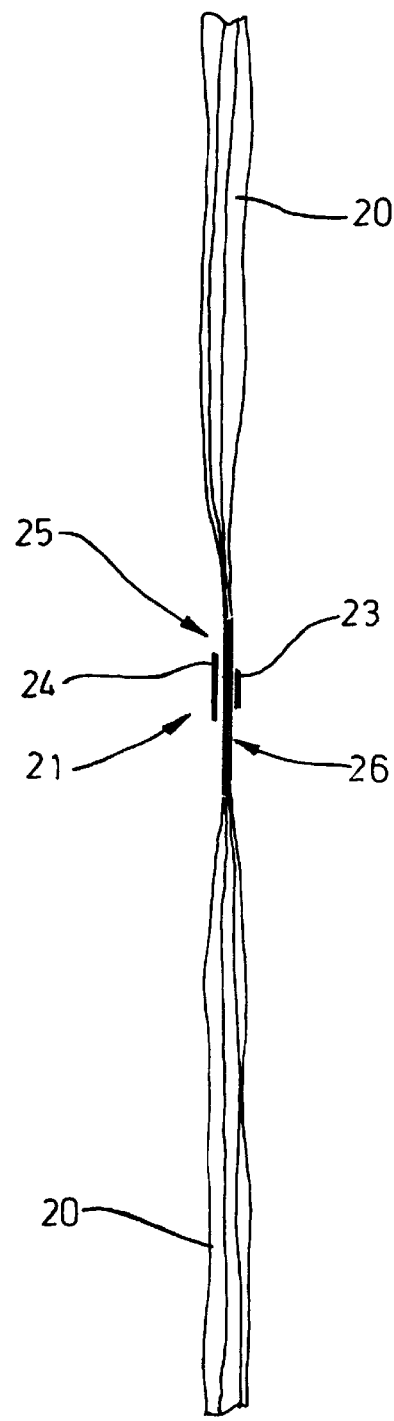
FIG. 4 shows a side view of the filling material according to FIG. 3.
Figure 5:
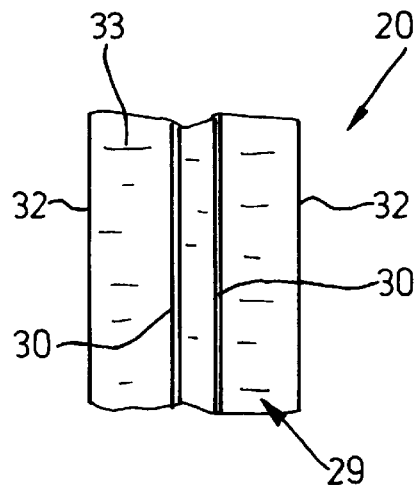
FIG. 5 shows in an enlarged representation, a surface view of a portion of a single strip of the filling material according to a first exemplary embodiment of the invention.
Figure 6:
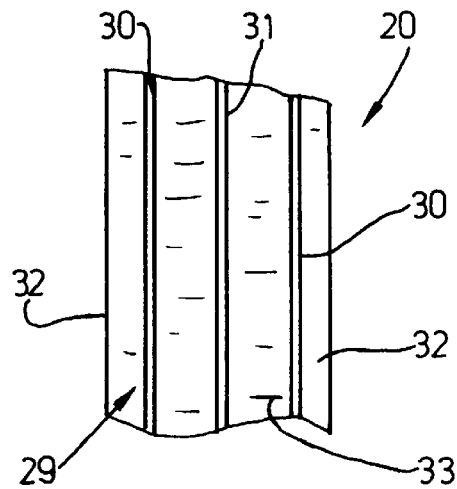
FIG. 6 shows a representation corresponding to that of FIG. 5 according to a second exemplary embodiment of the invention.
Figure 7:
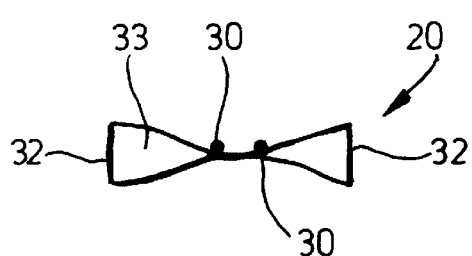
FIG. 7 shows a cross-section through the strip according to FIG. 5.
Figure 8:
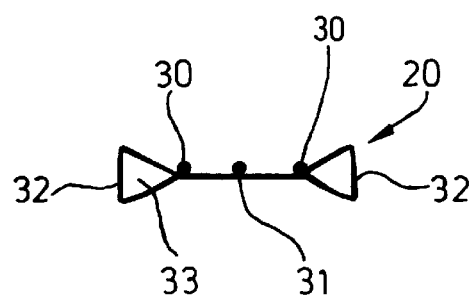
FIG. 8 shows a cross-section through the strip according to FIG. 6.

The strips 20 project with a region of approximately equal length on the left and right in relation to the holding web 21 (FIG. 3). Each strip extends further uninterruptedly in the region of the holding web 21, and a single strip 20 serves for forming the two parts of the filling material, namely the filling material located on the left and on the right of the holding web 21.

In the present case, the strips 20 are connected to the holding web 21 by means of two parallel sealing seams 22. The sealing seams 22 extend at a distance from and parallel to the side edges of the holding web 21. Between the sealing seams 22, too, the strips 20 extend without being connected to one another or to the holding web 21.

In the present exemplary embodiment, the holding web 21 consists of two parallel part webs 23 and 24. The strips 20 extend between the part webs 23 and 24. The sealing seams 22 on the one hand connect the strips 20 to the part webs 23 and 24 of the holding web 21, and on the other hand they connect the part webs 23 and 24 directly to one another.

Figure 1:
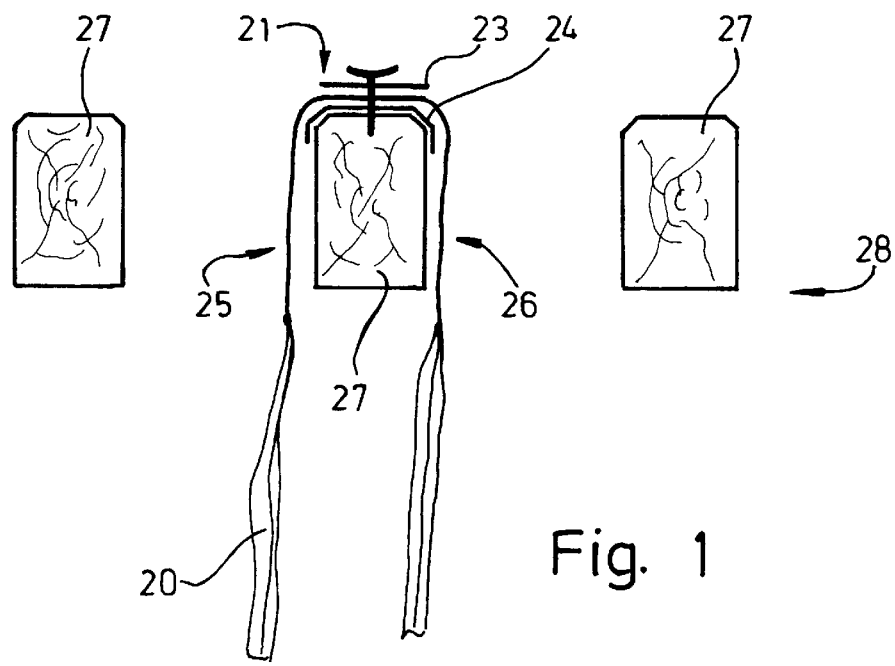
FIG. 1 shows a cut out from a percolating filter with a filling material hung over a carrier structure, in a view from the front.
Figure 2:
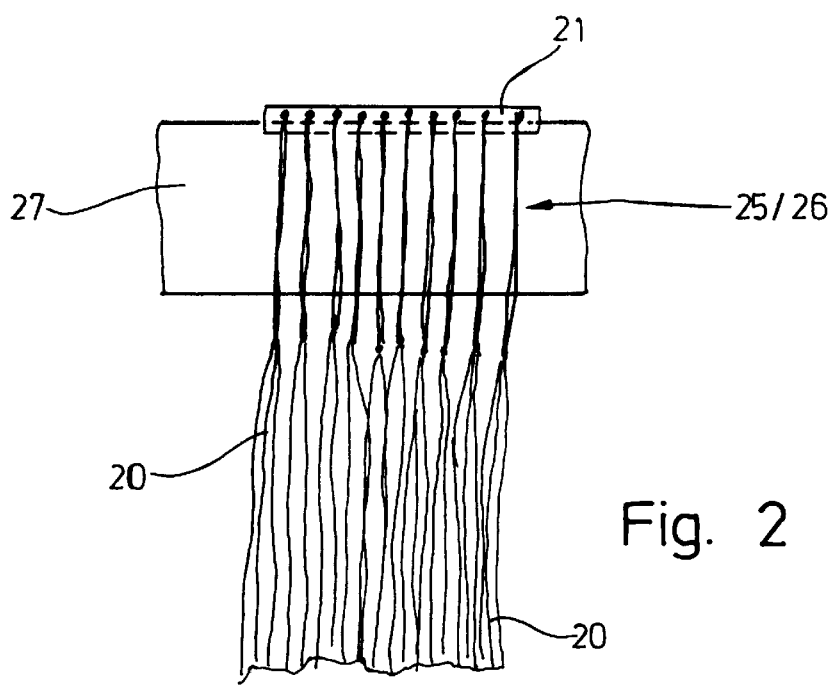
FIG. 2 shows a cut out from the percolating filter according to FIG. 1 in a side view.

The strips 20 have a reduced cross-section in the region of the holding web 21 and in the regions 25 and 26 immediately on the left and /or right next to the holding web. The width of the strips 20 decreases from the ends of these towards the holding web 21. This decrease in width of the strips 20 can take place both continuously in a stepless manner and in a stepped manner all-round. The regions 25 and 26 having reduced width of the strips 20 are co-ordinated with the dimensions of a carrier beam 27 of a carrier device 28 (FIG. 1 and FIG. 2). The filling material according to the invention is hung on the carrier beam 27. The filling material is laid over the carrier beam 27 in a U-shaped manner. Part of the holding web 21 covers the upper horizontal surface of the carrier beam 27. The opposite vertical surfaces of the carrier beam 27 are for the most part not covered on account of the narrowing in cross-section of the strips 20. The fluid to be treated does not build up in the region of the carrier beams, but flows off rapidly onto the portions of the strips 20 located underneath. Alternatively, it is possible for the strips 20 to have a reduced cross-section, especially a reduced width, only in the region of the holding web 21.

In the present exemplary embodiments (FIGS. 1 to 8), teach strip 20 is assigned a tension member, namely a strand group 29. The strand group 29 consists of two or three tension-absorbing individual strands 30. The individual strands 30 of a strand group 29 extend parallel to and at an equal distance from one another. They extend over the entire length of the strips 20. The arrangement of the individual strands 30 is such that they are located on one side of the strips 20, and that the outer individual strands 30 are at approximately the same distance from the edges 32 of the strip 20. Alternatively, it is also possible to arrange a strand group 29 on both sides of each strip 20. Finally, it is also possible to arrange only a single strand 31 on each side of the strips 20, specifically both opposite and offset to one another.

It can be seen from FIGS. 5 to 8 that, in contrast to the strand group 29 which extends approximately in a straight line, the strip 20 is crimped, specifically in such a way that it has creases 33 extending transversely relative to the longitudinal direction. The parallel edges 32 of the strip 20 therefore have a markedly wavy shape. This, proceeding from the edges 32, decreases gradually towards the strand group 29. As a result of this design, the strip 20 acquires a three-dimensional structure which is an optimum surface for the "biological lawn" to settle on it for biological sewage treatment.

The individual strands 30, 31 have an approximately circular cross-section, the diameter of which is considerably larger than the thickness of the material for the strip 20. A thermoplastic having little stretching, for example polypropylene or polyethylene, comes under consideration as a material for the individual strands 30, 31. The strip, supported by the individual strands 30, 31, consequently approximately preserves its length in the loaded state, that is to say with a "biological lawn" settled on the surface of the strip 20. The flattening of the strip 20 is avoided, and in particular the wavy structure of the edges 32 is preserved.

The strand group 29 determines the degree of the narrowing in cross-section of the strips 20 in the region of the holding web 21 and in the regions 25, 26 immediately on the left and/or right next to the holding web 21. The greater the distance between the outer individual strands 30 and the edges 32 of the strip 20, the greater also the narrowing in cross-section in the regions 25, 26 and in the region of the holding web 21 (FIG. 3).

Figure 9:
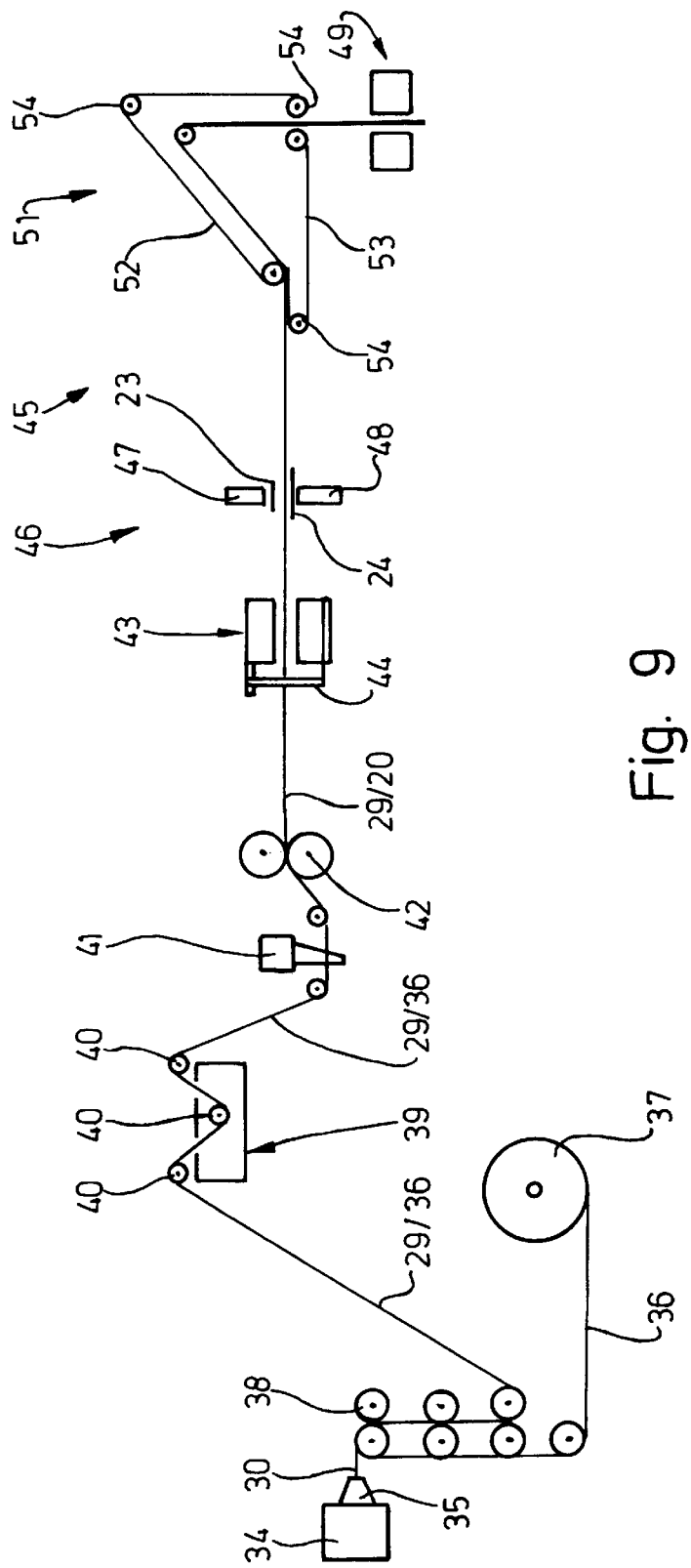
FIG. 9 shows a side view of an apparatus for producing the filling material.

An apparatus for the production of the filling material according to the invention, with two individual strands 30 for each strip 20 is shown diagrammatically in FIGS. 9 and 10. In the apparatus illustrated, a plurality of individual strands 30 lying at a distance next to one another are produced by an extruder 34. The individual strands 30 emerging from the dies 35 of the extruder 34 are combined, still in the hot state with a cold material web 36 and are welded or sealed to the latter. To this purpose, the material web 36 is drawn off from a stock roll 37 and guided between corresponding pairs of rollers, namely in the present exemplary embodiment, three pairs of rollers 38. The individual strands 30 emerging from the dies 35 of the extruder 34 and still hot also extend between these. As A result, when the individual strands 30 and the material web 36 are guided through the pairs of rollers 38, a welding of the individual strands 30 together with the material web 26 takes place.

Downstream of the pairs of rollers 38, the material web 36 provided with the strand groups 29 or individual strands 30 in guided through a cooling station 39. At the same time, the material web 36 is guided via a plurality of deflecting rollers 40. During the cooling of the individual strands 30 taking place in the cooling station 39, these contract. At the same time, the cold, that is to say non-contracting material web 36 is drawn together, with the result that it acquires its special crimping occurring at the edges 32.

Downstream of the cooling station 39, the crimped material web 36 thus provided with the strand groups 29 is fed to a cutting device 41. The material web 36 is cut into strips 20. The material web 36 is cut into strips 20 in such a way that a strand group 29 consisting of two individual strands 30 is located on each strip 20.

Downstream of the cutting unit 41, the material web 36 cut into strips 20 is fed by way of a pair of draw-off rollers 42 to a shrinkage device 43 via deflecting bolts 44. In the shrinkage device 43, the strips 20 are reduced in width in regions. The reduction in width of the strips 20 is carried out thermally. For this purpose, the strips are treated with hot air. The thermal treatment of the strips 20 is carried out at regular time intervals, so that selected regions of reduced width of the strips 20 are produced.

After the reduction in width of the strips 20 in the shrinkage device 43 a final treatment zone 45 follows. In this, the connection of the strips 20 to the transversely directed holding web 21 takes place. The holding web 21 consists of two part webs 23 and 24. These are drawn off from corresponding material rolls. During the momentary standstill of the strips 20 and of the part webs 23, 24, a sealing together of these takes place in a sealing station 46. The sealing of the strips 20 together with the part webs 23, 24 takes place on both sides of the strips 20 by means of a pair of transversely directed sealing jaws 47, 48 which bring about sealing under the effect of heat and by momentary compression. In order thereby to give rise to the two parallel sealing seams 22, the (upper) sealing jaw 47 has, on its underside, two parallel ribs which, during sealing, form two parallel contact strips of the holding web 21. The part webs 23, 24 of the holding web 21 are sealed partly together with the strips 20 and partly to one another.

Simultaneously with the sealing of the strips 20 on the holding web 21, a separation of one filling material from the following filling material takes place by means of a cutting device 49 arranged at a distance from the sealing station 46. Alternatively, it is also possible for the strips 20 now connected to the holding web 21 to be fed to a sealing device 50 instead of a cutting device 49. Here, a marking of the transition from one filling material to the following tilling material takes place by the formation of a marking strip. The strips are fed to the cutting device 49 or to the sealing device 50 via a drawing-off station, especially via a belt conveyor 51. The belt conveyor 51 consists of two individual belts 52 and 53 which are guided via deflecting rollers 54. The filling material bears in the region of contact of individual belts 52 and 53 and is drawn off. At least one of the deflecting rollers 54 of the above-described apparatus can be driven in rotation in order to draw the material web 36 to be finished through the cutting device 41, the shrinkage device 43 and the sealing station 46.

What is claimed is:

1. Filling material for percolating filters for the treatment of fluids, especially for biological sewage purification, with a multiplicity of plastic strips which are connected to a holding web extending transversely relative to their longitudinal direction for a hanging arrangement on a carrier device, wherein the strips are reduced in width in regions adjacent to the connection to the holding web.

2. Filling material according to claim 1, wherein the strips have a different width over their length.

3. Filling material according to claim 1, wherein the width of the strips decreases from the ends of these towards the holding web, the holding web being arranged approximately centrally between the ends of the strips located opposite one another.

4. Filling material according to claim 1, wherein the width of the strips decreases at least in the region of the holding web.

5. Filling material according to claim 1, wherein at least one tension-absorbing strand is arranged on at least one side of the strips, the strand or strands extending in the longitudinal direction of the strips.

6. Filling material for percolating filters for the treatment of fluids, especially for biological sewage purification, with a multiplicity of plastic strips which are connected to a holding web extending transversely relative to their longitudinal direction, wherein the holding web is formed from two parallel part webs, the strips extending between the part webs of the holding web and being connected firmly to the part webs.

7. Filling material according to claim 6, wherein the strips are reduced in width in regions adjacent to the connections to the part webs.

8. Filling material according to claim 7, wherein the strips are also reduced in width in regions beyond the connections to the part webs.

9. Filling material according to claim 6, wherein the width of the strip decreases from opposite ends of the strips towards the holding web, the holding web being arranged approximately midway between the ends of the strips.

10. Filling material according to claim 1, wherein the strips are also reduced in width in regions beyond the connection to the holding web.

11. Process for the production of filling material serving for the treatment of fluids, especially for biological sewage purification, comprising the step of: arranging strips so that they are lying next to one another, the strips being formed from a material web and the strips being connected to at least one transversely directed holding web, wherein the strips are reduced in width in regions adjacent to the areas of connection to the holding web or holding webs.

12. Process according to claim 11, wherein the strips are treated thermally, especially with hot air, to reduce the width, the thermal treatment of the strips being carried out at regular time intervals.

13. Process according to claim 11, wherein the strips are connected on both sides to the holding web.

14. Process according to claim 11, wherein, during the application of the holding web, the strips are severed from the material web.

* * * * *